Sept. 28, 1926.  
W. B. LASKEY  
1,601,536  
DIE FOR EXTRUDING CANDY  
Filed May 9, 1925 3 Sheets-Sheet 1

Fig. I.

INVENTOR  
*William Bartlett Laskey.*  
BY *Mock & Blum*  
ATTORNEYS

Sept. 28, 1926.

W. B. LASKEY 1,601,536

DIE FOR EXTRUDING CANDY

Filed May 9, 1925

INVENTOR
William Bartlett Laskey
BY Mocker Blum
ATTORNEYS

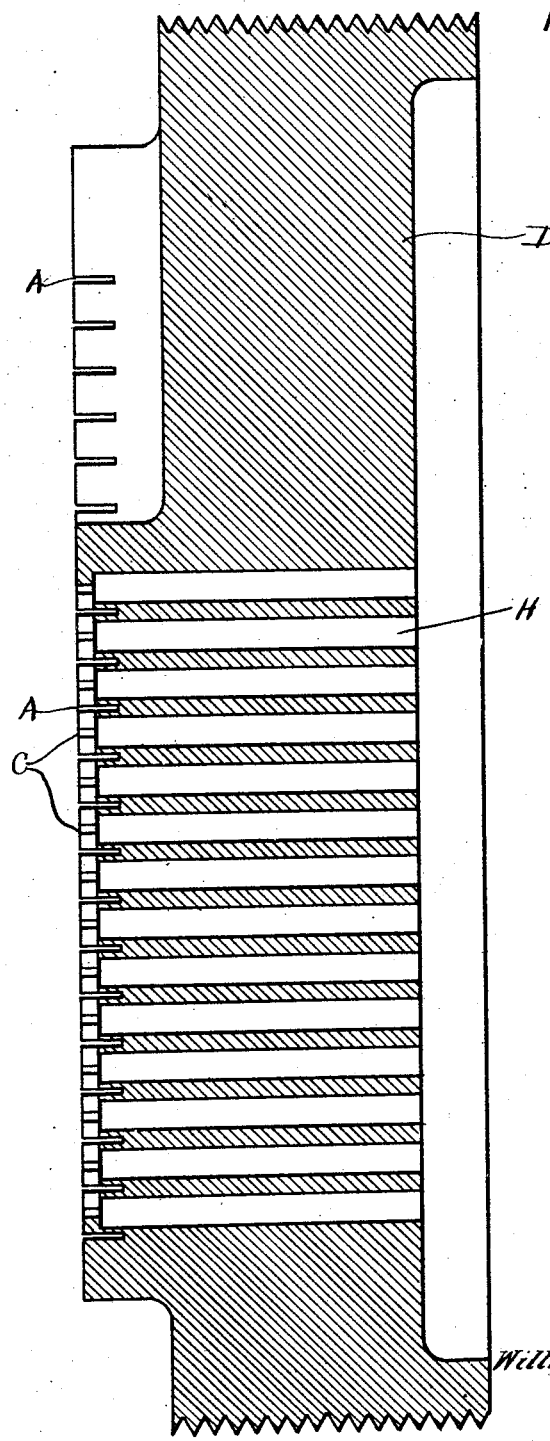

Patented Sept. 28, 1926.

1,601,536

UNITED STATES PATENT OFFICE.

WILLIAM BARTLETT LASKEY, OF BROOKLYN, NEW YORK, ASSIGNOR TO THE CHOCO-LATE SPONGE CO., INC., OF BROOKLYN, NEW YORK, A CORPORATION OF NEW YORK.

DIE FOR EXTRUDING CANDY.

Application filed May 9, 1925. Serial No. 29,112.

My invention relates to a new and improved die for extruding candy and the like in order to form a mass of candy having a continuous cellular structure.

One of the objects of my invention is to provide a die which will be of simple and strong construction and which can be readily manufactured.

Another object of my invention is to provide a die which shall require much less pressure in order to extrude the candy.

Another object of my invention is to provide a die whereby the candy is extruded from a reservoir in the form of a number of separate streams which coalesce to form a cellular mass of candy after these separate streams leave the face of the die.

Another object of my invention is to provide a die having means for admitting air into the said cellular mass of candy and which will not require an air pump or other means for forcing in air under pressure.

Another object of my invention is to provide a die whereby the candy will be formed into a cellular mass, the cells of the said mass having a substantially square cross-section.

Other objects of my invention will be set forth in the following description and drawings which illustrate a preferred embodiment thereof, it being understood that the above mentioned general statement of the objects of my invention is intended to merely explain the same and not to limit it.

Fig. 3 is a sectional view on the line 3—3 of Fig. 1.

In order to make the die D, a solid casting is first made which has the general shape and contour of the said die. A series of recesses H are formed in the rear of the die and these recesses H are finished off with a squaring drill or bore so as to make recesses having the contour shown in Fig. 3.

A series of air passages or slots A are then milled into the face of the die. These air slots or passages A are parallel to each other and equally spaced, as shown in Fig. 1.

A second series of candy slots or passages C are then milled into the face of the die. As shown in Fig. 3, the air slots A are milled into the walls or partitions separating the recesses H. The candy slots or passages C are not as deep as the air slots A and they communicate with the interiors of the respective recesses or bores H.

The die has external threading as shown in Fig. 3, so that it can be secured to the mouth of a cylinder containing the candy or other substance to be extruded. I have not shown this cylinder or the various mechanisms for extruding the candy under pressure, because these in themselves are well known and form no part of my invention As shown in Fig. 1, the candy slots C comprise two series. The members of one of said series are parallel to and intermediate the air slots A, and these are symmetrically disposed with respect to the air slots A. The members of the second series of the candy slots C are perpendicular to the members of the first series and they are also equally spaced.

Figure 1:
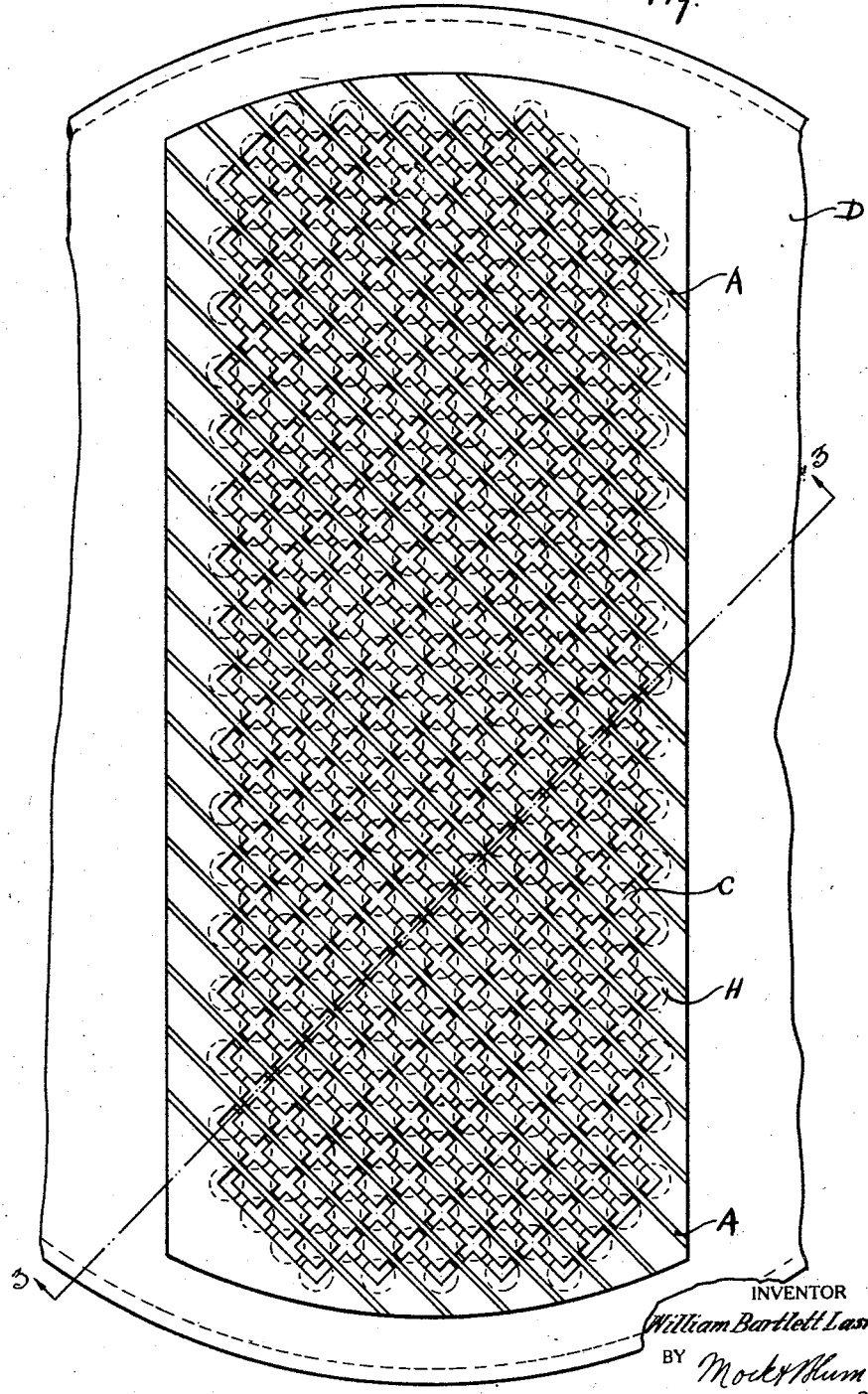
Fig. 1 is a front view.
Figure 2:
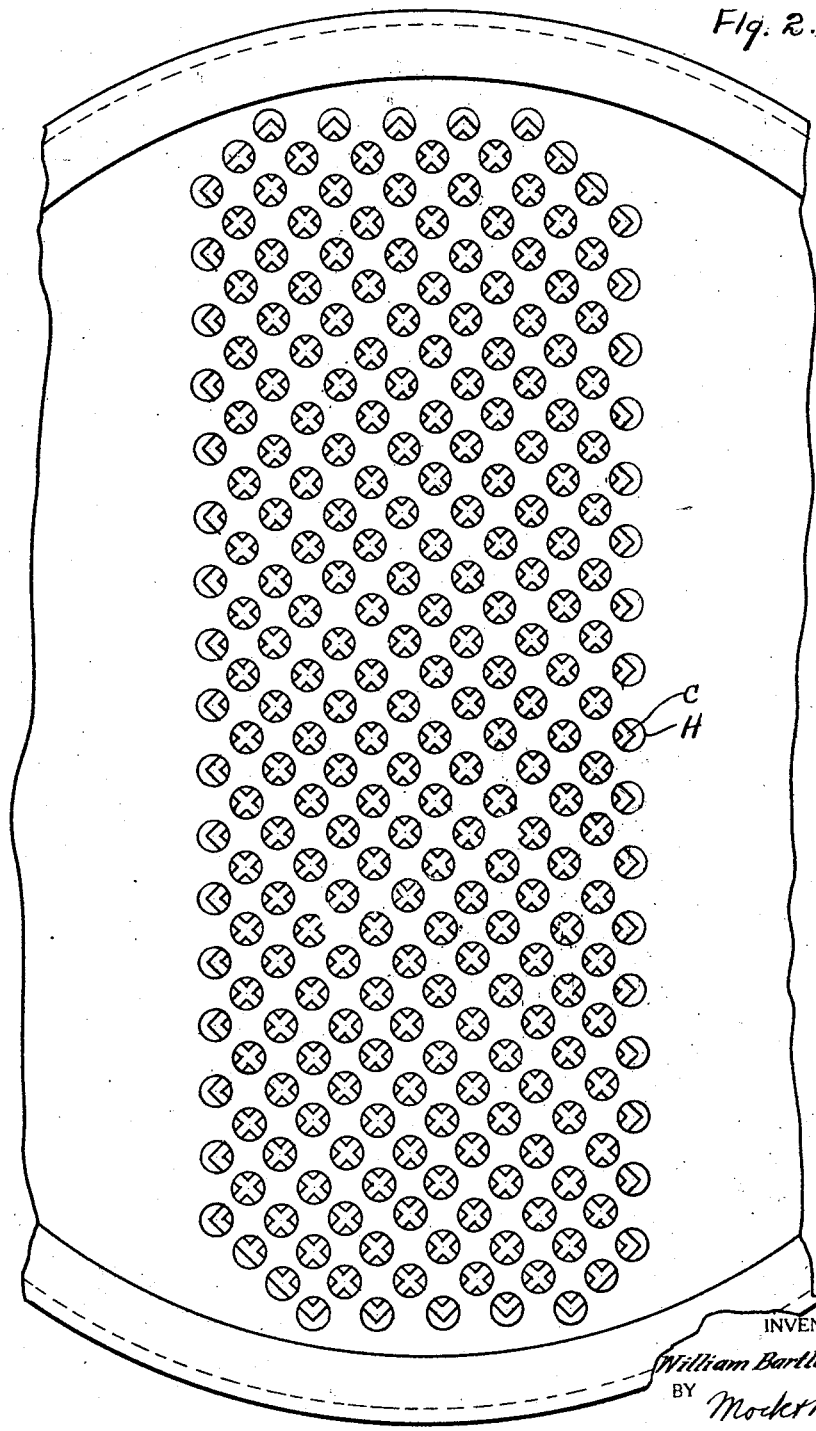
Fig. 2 is a rear view, some of the detail being omitted for the sake of clearness.

Hence, as clearly shown in Fig. 1, the mouth of each recess H, save for the marginal recesses H, is traversed by two candy slots C which are perpendicular to each other and which pass through the center of their respective bore or recess. Each of the marginal recesses H is also provided with two perpendicular candy slots C which, however, may be called "radial," in that each said slot extends from the center of the respective marginal recess to the border thereof. The slots in the other recesses H, which may be called the inner recesses, have what may be termed diametral slots, in that each said slot occupies the same position as the diameter of the mouth of said recess.

Hence, when candy is extruded through the die D so that it moves from a position at the right-hand side of Fig. 3 out through the various candy slots, the candy is extruded from the face of the die through the pairs of diametral slots in each inner recess in the form of a stream consisting of two bars of candy having a common central portion and which are at right angles to each other.

As soon as these inner streams pass beyond the face of the die, they are free to expand laterally and they do expand laterally because they have been subjected to considerable pressure while being forced through the die. This pressure is about 750 lbs. per square inch, but it may vary with the type of candy which is being extruded.

These inner bars of candy expand sufficiently so as to contact with each other outside the face of the die. The candy which is extruded through the marginal bores of recesses H is extruded in the form of angular bars so that a complete outer wall is provided for the bar of candy which is being extruded.

Since the air slots A are deeper than the candy slots C, the atmospheric air is free at all times to enter the air slots A so that while the streams of candy coalesce over the air slots A, they cannot clog them up at any time, and sufficient air enters through the air slots A without any external pressure means such as a pump or the like, to cause the cells of the mass of candy to be constantly filled with air, which assists in preventing the collapse of the said cells.

The extruded candy is caused to move away from the face of the die as rapidly as the cellular mass is formed outside the face of the die, and the said cellular mass of candy thus formed may be pulled down in the ordinary and well known manner so as to rapidly move it away from the face of the die and to reduce the areas of the respective cells formed.

Experience has shown that the pressure required to extrude candy through my new and improved die can be as low as one-half the pressure required to extrude candy or the like through dies which have been previously known and used.

It is also obvious that since the die is made of a single casting that it is extremely strong and there is nothing to get out of order by the shifting of parts due to the high pressure employed for extruding the substance.

I have described a preferred embodiment of my invention, but it is clear that numerous changes and omissions could be made without departing from its spirit.

I claim:—

1. In an extrusion die, the combination of recesses extending from the rear of the die in the direction of the face thereof, the said recesses having intermediate walls, the face of said die having two series of extrusion slots communicating with the interiors of said recesses, the members of one of said series of extrusion slots forming an angle with the members of the other series of said extrusion slots, the said recesses being so close to each other that the ends of the bars of material extruded through said extrusion slots coalesce outside of said die to form a continuous mass having longitudinal passages, and means adapted to admit air into said passages.

2. A device according to claim 1 in which the said slots pass through the central axis of the said recess and are perpendicular to each other.

3. In an extrusion die, the subcombination of a plurality of separated recesses formed in the back of the said die and extending towards the front of the said die, the said recesses having intermediate walls, the face of the said die having two series of extrusion slots communicating with the interiors of the said recesses, the members of one of said series of extrusion slots forming an angle with the members of the other series of said extrusion slots, the front of said die also having air slots passing through the walls intermediate the said recesses.

4. An extrusion die having a series of recesses formed in the back thereof and extending towards the front thereof, the said recesses being separated by intermediate walls, the front of the die having a plurality of parallel air slots formed in the said walls and separated from the interiors of the said recesses, the front of the said die also having two series of extrusion slots passing through the central axes of the said recesses, one of said series of extrusion slots being parallel to and intermediate the said air slots, the other series of said extrusion slots being perpendicular to the said air slots, the said extrusion slots being of sufficient depth to communicate with said recesses.

In testimony whereof I affix my signature.

WILLIAM B. LASKEY.